(12) United States Patent
Vogt

(10) Patent No.: US 6,470,793 B1
(45) Date of Patent: Oct. 29, 2002

(54) WHEELED COFFEE MAKER DEVICE

(76) Inventor: Sidney R. Vogt, 1420 Kase, Weatherford, OK (US) 73096

( * ) Notice: Subject to any disclaimer, the term of this patent is extended or adjusted under 35 U.S.C. 154(b) by 0 days.

(21) Appl. No.: 09/865,311

(22) Filed: May 25, 2001

(51) Int. Cl.[7] ............................................. A47J 31/00
(52) U.S. Cl. ........................ 99/279; 99/304; 99/290; 99/323.3
(58) Field of Search .................. 99/275, 279, 304, 99/290, 323.3, 318; 248/346.5, 346.01, 129; 280/47.137, 47.17, 47.24, 47.34

(56) References Cited

U.S. PATENT DOCUMENTS

| 455,280 | A |   | 6/1891  | Emerson |         |
|---------|---|---|---------|---------|---------|
| 2,868,558 | A | * | 1/1959  | Krauss  | 248/129 X |
| 4,076,349 | A |   | 2/1978  | Gettleman et al. |  |
| D287,212 | S |   | 12/1986 | Daugherty |        |
| D291,525 | S |   | 8/1987  | Classen |         |
| 4,704,954 | A |   | 11/1987 | Mollenhoff |       |
| 4,974,500 | A |   | 12/1990 | Boyd et al. |      |
| 6,240,830 | B1 | * | 6/2001 | Goldston | 99/279 |

FOREIGN PATENT DOCUMENTS

DE        3311-290    * 10/1984   ................ 99/323.3

* cited by examiner

*Primary Examiner*—Reginald L. Alexander

(57) ABSTRACT

A wheeled coffee maker device for allowing a user to more easily move the coffee maker about upon a countertop. The wheeled coffee maker device includes a conventional coffee-making unit including a base housing, a heating plate mounted upon a top of the base housing, a coffee-making housing being disposed above the base housing, a coffee pot, and a filter member being removably attached to the coffee-making housing; and also includes a wheel assembly being mounted to a bottom of the base housing; and further includes non-slippage support members being securely attached to the bottom of the base housing to prevent the coffee-making unit from uncontrolled rolling; and also includes a handle being securely attached to the base housing to facilitate rolling of the coffee-making unit.

8 Claims, 3 Drawing Sheets

WHEELED COFFEE MAKER DEVICE

BACKGROUND OF THE INVENTION

1. Field of the Invention

The present invention relates to wheeled coffee maker devices and more particularly pertains to a new wheeled coffee maker device for allowing a user to more easily move the coffee maker about upon a countertop.

2. Description of the Prior Art

The use of wheeled coffee maker devices is known in the prior art. More specifically, wheeled coffee maker devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. Des. 287,212; U.S. Pat. No. 4,704,954; U.S. Pat. No. Des. 291,525; U.S. Pat. No. 4,076,349; U.S. Pat. No. 4,974,500; and U.S. Pat. No. 455,280.

While these devices fulfill their respective, particular objectives and requirements, the aforementioned patents do not disclose a new wheeled coffee maker device. The inventive device includes a conventional coffee-making unit including a base housing, a heating plate mounted upon a top of the base housing, a coffee-making housing being disposed above the base housing, a coffee pot, and a filter member being removably attached to the coffee-making housing; and also includes a wheel assembly being mounted to a bottom of the base housing; and further includes non-slippage support members being securely attached to the bottom of the base housing to prevent the coffee-making unit from uncontrolled rolling; and also includes a handle being securely attached to the base housing to facilitate rolling of the coffee-making unit.

In these respects, the wheeled coffee maker device according to the present invention substantially departs from the conventional concepts and designs of the prior art, and in so doing provides an apparatus primarily developed for the purpose of allowing a user to more easily move the coffee maker about upon a countertop.

SUMMARY OF THE INVENTION

In view of the foregoing disadvantages inherent in the known types of wheeled coffee maker devices now present in the prior art, the present invention provides a new wheeled coffee maker device construction wherein the same can be utilized for allowing a user to more easily move the coffee maker about upon a countertop.

The general purpose of the present invention, which will be described subsequently in greater detail, is to provide a new wheeled coffee maker device which has many of the advantages of the wheeled coffee maker devices mentioned heretofore and many novel features that result in a new wheeled coffee maker device which is not anticipated, rendered obvious, suggested, or even implied by any of the prior art wheeled coffee maker devices, either alone or in any combination thereof.

To attain this, the present invention generally comprises a conventional coffee-making unit including a base housing, a heating plate mounted upon a top of the base housing, a coffee-making housing being disposed above the base housing, a coffee pot, and a filter member being removably attached to the coffee-making housing; and also includes a wheel assembly being mounted to a bottom of the base housing; and further includes non-slippage support members being securely attached to the bottom of the base housing to prevent the coffee-making unit from uncontrolled rolling; and also includes a handle being securely attached to the base housing to facilitate rolling of the coffee-making unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheeled coffee maker device which has many of the advantages of the wheeled coffee maker devices mentioned heretofore and many novel features that result in a new wheeled coffee maker device which is not anticipated, rendered obvious, suggested, or even implied by any of the prior art wheeled coffee maker devices, either alone or in any combination thereof.

It is another object of the present invention to provide a new wheeled coffee maker device which may be easily and efficiently manufactured and marketed.

It is a further object of the present invention to provide a new wheeled coffee maker device which is of a durable and reliable construction.

An even further object of the present invention is to provide a new wheeled coffee maker device which is susceptible of a low cost of manufacture with regard to both materials and labor, and which accordingly is then susceptible of low prices of sale to the consuming public, thereby making such wheeled coffee maker device economically available to the buying public.

Still yet another object of the present invention is to provide a new wheeled coffee maker device which provides in the apparatuses and methods of the prior art some of the advantages thereof, while simultaneously overcoming some of the disadvantages normally associated therewith.

Still another object of the present invention is to provide a new wheeled coffee maker device for allowing a user to more easily move the coffee maker about upon a countertop.

Yet another object of the present invention is to provide a new wheeled coffee maker device which includes a conventional coffee-making unit including a base housing, a heating plate mounted upon a top of the base housing, a coffee-making housing being disposed above the base housing, a coffee pot, and a filter member being removably attached to the coffee-making housing; and also includes a wheel assembly being mounted to a bottom of the base housing; and further includes non-slippage support members being securely attached to the bottom of the base housing to prevent the coffee-making unit from uncontrolled rolling; and also includes a handle being securely attached to the base housing to facilitate rolling of the coffee-making unit.

Still yet another object of the present invention is to provide a new wheeled coffee maker device that is easy and convenient to use.

Even still another object of the present invention is to provide a new wheeled coffee maker device that eliminates back strains and makes the coffee maker easier to move about to clean around and about the coffee maker.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
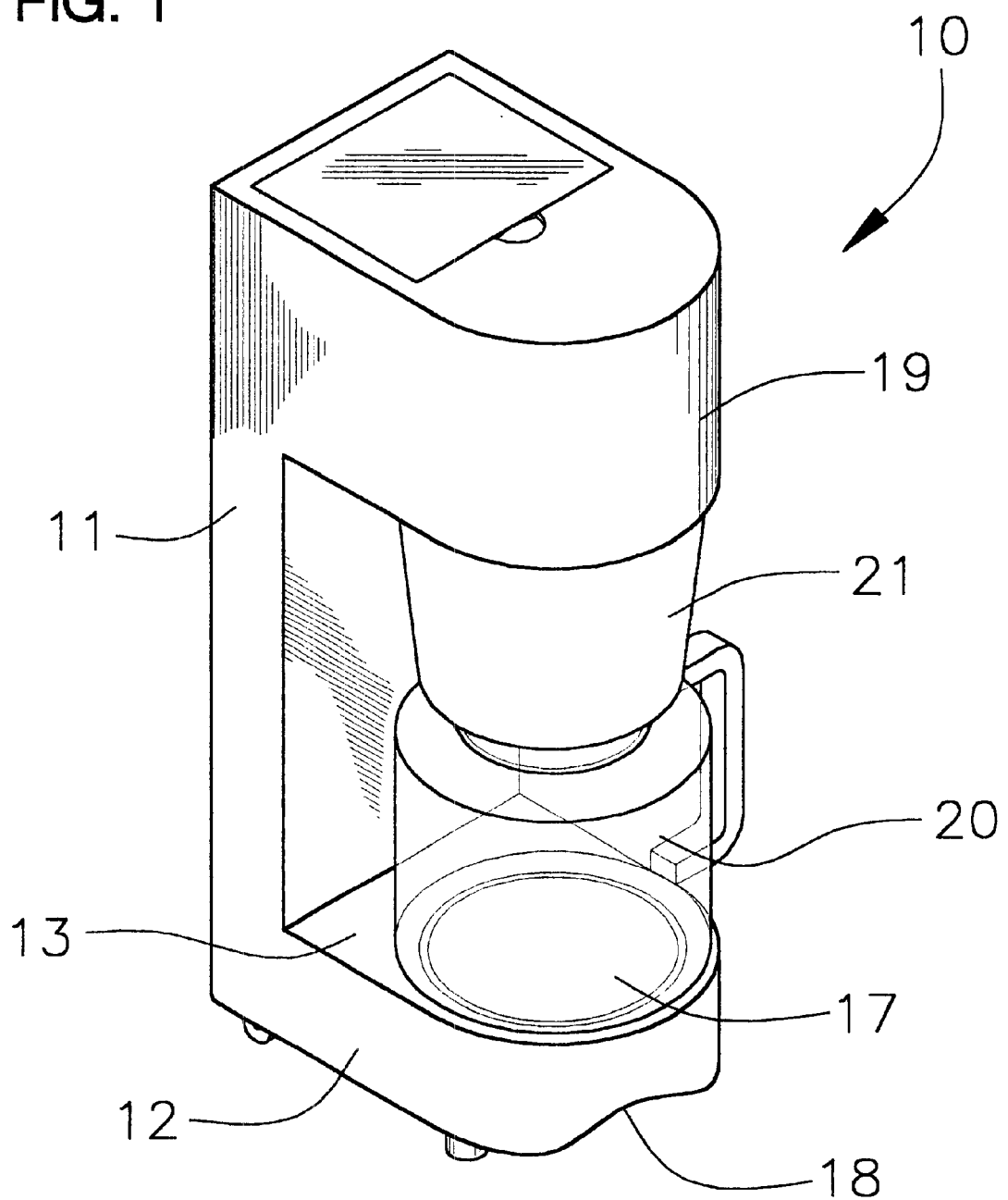
FIG. 1 is a perspective view of a new wheeled coffee maker device according to the present invention.
Figure 2:
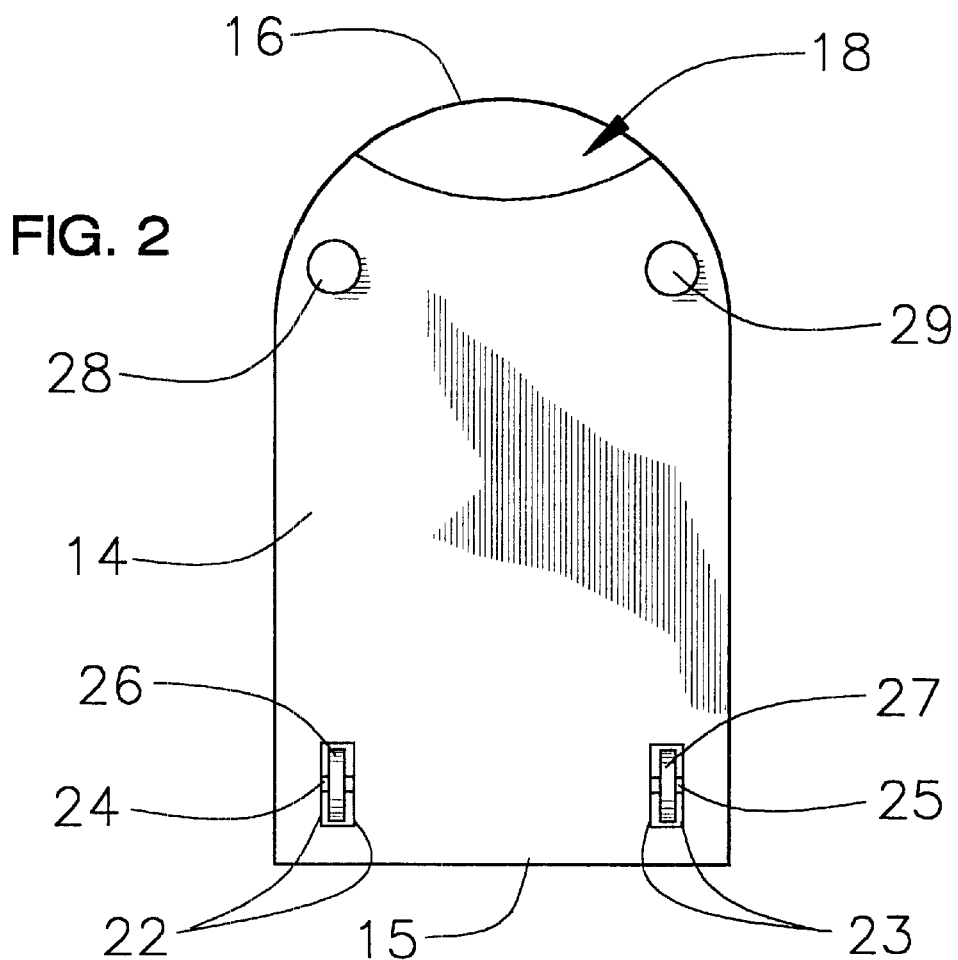
FIG. 2 is a bottom plan view of the present invention.
Figure 3:
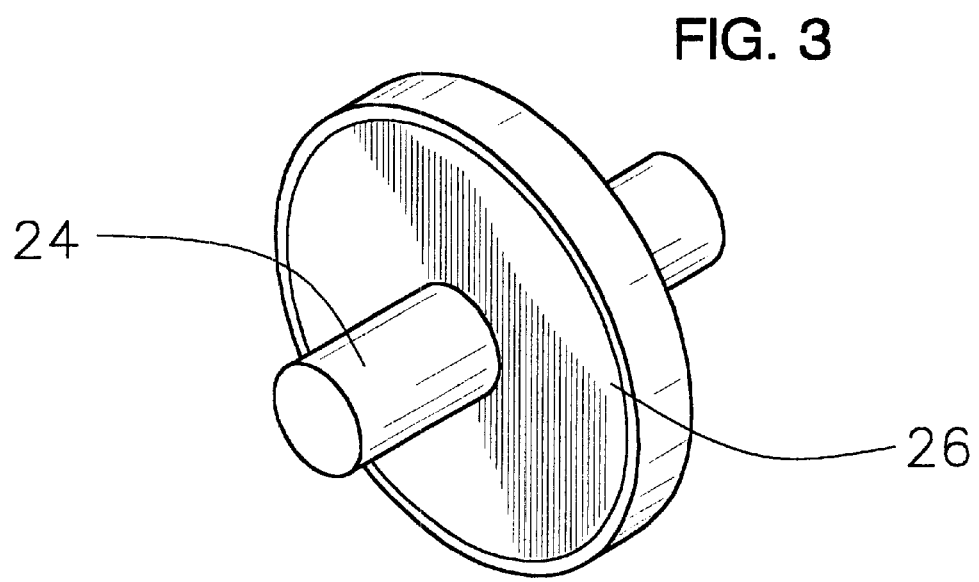
FIG. 3 is a detailed perspective view of one of the wheel members of the present invention.
Figure 4:
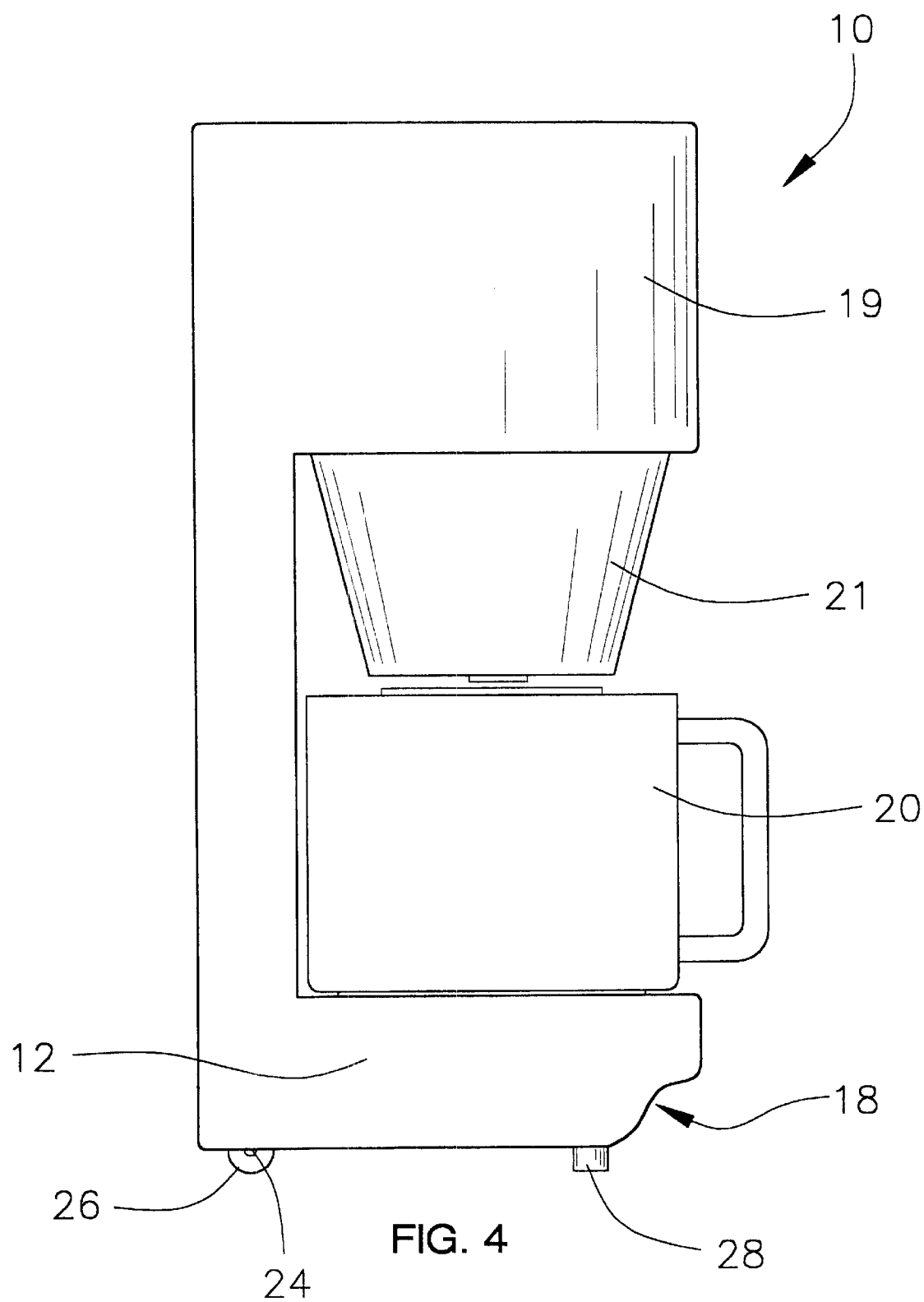
FIG. 4 is a side elevational view of the present invention.

With reference now to the drawings, and in particular to FIGS. 1 through 4 thereof, a new wheeled coffee maker device embodying the principles and concepts of the present invention and generally designated by the reference numeral 10 will be described.

As best illustrated in FIGS. 1 through 4, the wheeled coffee maker device 10 generally comprises a conventional coffee-making unit 11 including a base housing 12, a heating plate 17 being conventionally mounted upon a top 13 of the base housing 12, a coffee-making housing 19 being disposed above the base housing 12, a coffee pot 20, and a filter member 21 being removably and conventionally attached to the coffee-making housing 19. A wheel assembly is mounted to a bottom 14 of the base housing 12. The wheel assembly includes pairs of brackets 22,23 being securely and conventionally attached to the bottom 14 near a back end 15 of the base housing 12, and also includes axles 24,25 being journaled to the pairs of brackets 22,23, and further includes wheel members 26,27 being rotatably mounted to the axles 24,25.

Non-slippage support members 28,29 are securely and conventionally attached to the bottom 14 of the base housing 12 to prevent the coffee-making unit 11 from uncontrolled rolling. The non-slippage members 28,29 include disc-shaped foot members being securely and conventionally attached to the bottom 14 near a front end 16 of the base housing 12 to facilitate non-slippage of the coffee-making unit 11. A handle 18 is securely attached to the base housing 12 to facilitate rolling of the coffee-making unit 11. The handle 18 includes a contoured depression being disposed in the bottom 14 and along the front end 16 of the housing base 12. The depression is adapted to allow a user to grasp, lift, and move the coffee-making unit 11.

In use, the user sits the coffee-making unit 11 upright upon the wheel member 26,27 and upon the non-slippage support members 28,29, and grasps and lifts the handle 18 and moves the coffee-making unit 11 to whatever location upon a countertop.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheeled coffee maker device comprising:
   a coffee-making unit including a base housing, a heating plate mounted upon a top of said base housing, and a coffee-making housing being disposed above said base housing;
   a wheel assembly being mounted to a bottom of said base housing;
   support members being attached to said bottom of said base housing for resisting uncontrolled rolling of said coffee-making unit; and
   a handle being attached to said coffee-making unit to facilitate rolling of said coffee-making unit:
   wherein said handle includes a contoured depression being disposed in said bottom and along a front end of said base housing for allowing a user to grasp, lift, and move said coffee-making unit.

2. A wheeled coffee maker device as described in claim 1, wherein said wheel assembly includes pairs of brackets being attached to said bottom near a back end of said base housing, and also includes axles being mounted on said pairs of brackets, and further includes wheel members being rotatably mounted to said axles.

3. A wheeled coffee maker device as described in claim 1, wherein said non-slippage members include disc-shaped foot members being attached to said bottom near a front end of said base housing to facilitate non-slippage of said coffee-making unit.

4. A wheeled coffee maker device as described in claim 1, wherein said coffee-making unit includes a coffee pot and a filter member being removably attached to said coffee-making housing.

5. A wheeled coffee maker device comprising:

a conventional coffee-making unit including a base housing, a heating plate mounted upon a top of said base housing, a coffee-making housing being disposed above said base housing, a coffee pot, and a filter member being removably attached to said coffee-making housing;

a wheel assembly being mounted to a bottom of said base housing;

non-slippage support members being securely attached to said bottom of said base housing to prevent said coffee-making unit from uncontrolled rolling; and a handle being securely attached to said base housing to facilitate rolling of said coffee-making unit;

wherein said handle includes a contoured depression being disposed in said bottom and along a front end of said base housing, said depression being adapted to allow a user to grasp, lift, and move said coffee-making unit.

6. A wheeled coffee maker device as described in claim 5, wherein said wheel assembly includes pairs of brackets being attached to said bottom near a back end of said base housing, and also includes axles being mounted on said pairs of brackets, and further includes wheel members being rotatably mounted to said axles.

7. A wheeled coffee maker device as described in claim 5, wherein said non-slippage members include disc-shaped foot members being attached to said bottom near a front end of said base housing to facilitate non-slippage of said coffee-making unit.

8. A wheeled coffee maker device comprising:

a conventional coffee-making unit including a base housing, a heating plate mounted upon a top of said base housing, a coffee-making housing being disposed above said base housing, a coffee pot, and a filter member being removably attached to said coffee-making housing;

a wheel assembly being mounted to a bottom of said base housing, said wheel assembly including pairs of brackets being securely attached to said bottom near a back end of said base housing, and also including axles being journaled to said pairs of brackets, and further including wheel members being rotatably mounted to said axles;

non-slippage support members being securely attached to said bottom of said base housing to prevent said coffee-making unit from uncontrolled rolling, said non-slippage members including disc-shaped foot members being securely attached to said bottom near a front end of said base housing to facilitate non-slippage of said coffee-making unit; and a handle being securely attached to said base housing to facilitate rolling of said coffee-making unit, said handle including a contoured depression being disposed in said bottom and along a front end of said housing base, said depression being adapted to allow a user to grasp, lift, and move said coffee-making unit.

* * * * *